(12) United States Patent
Lin et al.

(10) Patent No.: US 11,550,403 B2
(45) Date of Patent: Jan. 10, 2023

(54) MODULAR KEYBOARD

(71) Applicants: Feng Lin, Guangdong (CN); Hao Jiang, Guangdong (CN)

(72) Inventors: Feng Lin, Guangdong (CN); Hao Jiang, Guangdong (CN)

(73) Assignee: Shenzhen Ajazz Tongchuang Electronic Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/646,873

(22) Filed: Jan. 4, 2022

(65) Prior Publication Data
US 2022/0300090 A1 Sep. 22, 2022

(30) Foreign Application Priority Data
Mar. 22, 2021 (CN) .......................... 202120583145.4

(51) Int. Cl.
*G06F 3/02* (2006.01)
(52) U.S. Cl.
CPC .................................. *G06F 3/0221* (2013.01)
(58) Field of Classification Search
CPC .... G06F 3/0202; G06F 3/0221; G06F 3/0216; G06F 3/02–027; G06F 1/1662–1671
See application file for complete search history.

(56) References Cited

U.S. PATENT DOCUMENTS

| | | | | |
|---|---|---|---|---|
| 6,040,977 A | * | 3/2000 | Hoffer | G06F 1/1616 361/679.19 |
| 2004/0051698 A1 | * | 3/2004 | Andres | G06F 3/0213 345/168 |
| 2006/0045599 A1 | * | 3/2006 | Ongkojoyo | G06F 3/0202 400/483 |
| 2010/0073855 A1 | * | 3/2010 | Liang | G06F 3/0219 361/679.08 |

* cited by examiner

*Primary Examiner* — Sanjiv D. Patel

(57) ABSTRACT

A modular keyboard includes a typewriter keys section; a function keys section; a keyboard shortcuts section; a numeric keypad; a cursor control and system command keys section; and a keyboard cable. The typewriter keys section includes first contacts on the back electrically connected to the function keys section, second contacts on the left side electrically connected to the keyboard shortcuts section, third contacts on the front end electrically connected to a hand rest board, fourth contacts on the right side electrically connected to the numeric keypad, and fifth contacts on the rear end electrically connected to the keyboard cable. The numeric keypad includes contacts on the right side electrically connected to the cursor control and system command keys section. The components can be detached prior to carrying same.

7 Claims, 10 Drawing Sheets

MODULAR KEYBOARD

FIELD OF THE INVENTION

The invention relates to keyboards and more particularly to a modular keyboard having improved characteristics including detachability and portability.

BACKGROUND OF THE INVENTION

A user may press a key or button of a keyboard, as an input device of computer, to input an alphanumeric character to the computer, or to call upon a particular function of the computer. Conventionally, a computer keyboard comprises alphanumeric or character keys for typing, modifier keys for altering the functions of other keys, navigation keys for moving the text cursor on the screen, function keys and system command keys for special actions, and often a numeric keypad to facilitate calculations.

However, it is impossible of carrying one or more of these sections of the computer keyboard since they are integrally formed. And in turn, it causes inconvenience to carry for use due to bulkiness.

Thus, the need for improvement still exists.

SUMMARY OF THE INVENTION

The invention has been made in an effort to solve the problems of the conventional art including components being formed as a unit, and inconvenience to carry for use due to bulkiness by providing a modular keyboard having novel and nonobvious characteristics including detachable components.

To achieve above and other objects of the invention, the invention provides a modular keyboard comprising a typewriter keys section; a function keys section; a keyboard shortcuts section; a numeric keypad; a cursor control and system command keys section; and a keyboard cable; wherein the typewriter keys section includes a plurality of first contacts on the back electrically connected to the function keys section, a plurality of second contacts on the left side electrically connected to the keyboard shortcuts section, a plurality of third contacts on the front end electrically connected to a hand rest board, a plurality of fourth contacts on the right side electrically connected to the numeric keypad, and a plurality of fifth contacts on the rear end electrically connected to the keyboard cable; and the numeric keypad includes a plurality of contacts on the right side electrically connected to the cursor control and system command keys section.

Preferably, the typewriter keys section further comprises a plurality of guide projections on either side of, the keyboard shortcuts section includes a plurality of guide grooves at either side, and the guide projections on the left side of the typewriter keys section are inserted into the guide grooves on the right side of the keyboard shortcuts section respectively.

Preferably, the typewriter keys section further comprises two internal motor driven moving devices and two pivotal glides on the bottom, each pivotal glide driven by the motor driven moving device.

Preferably, the typewriter keys section further comprises a lengthwise trough on the front end; and further comprising a hand rest board including a lengthwise protrusion on the rear end configured to complimentarily dispose in the trough, and two guide troughs in the protrusion.

Preferably, the typewriter keys section further comprises two guide protuberances on the trough, the guide protuberances configured to complimentarily dispose in the guide troughs respectively.

Preferably, the typewriter keys section further comprises two guide protrusions on the rear end; and the function keys section includes two guide wells on the front end, the guide wells configured to complimentarily receive the guide protrusions.

Preferably, the typewriter keys section further comprises a weight plate detachably, threadedly secured to the bottom; the function keys section includes two glides on the bottom; and the keyboard shortcuts section includes two glides on the bottom.

Preferably, the numeric keypad further comprises two guide grooves on either side of the numeric keypad, the guide grooves on the left side of the numeric keypad configured to complimentarily receive the guide projections of the right side of the typewriter keys section, and two glides on the bottom.

Preferably, the cursor control and system command keys section includes two guide grooves on either side and a plurality of glides on the bottom.

Preferably, further comprises a socket on the bottom of each of the typewriter keys section and the function keys section for attaching to an end of the keyboard cable.

The modular keyboard of the invention has the following advantageous effects in comparison with the prior art:

The typewriter keys section, the function keys section, the keyboard shortcuts section, the numeric keypad, the cursor control and system command keys section and the keyboard cable are detachably connected together. A user may attach the typewriter keys section to at least one of the function keys section, the keyboard shortcuts section, the numeric keypad, the cursor control and system command keys section and the keyboard cable as desired. Each of the typewriter keys section, the function keys section, the keyboard shortcuts section, the numeric keypad, the cursor control and system command keys section and the keyboard cable can be used independently. The user may detach at least one of the typewriter keys section, the function keys section, the keyboard shortcuts section, the numeric keypad, the cursor control and system command keys section and the keyboard cable prior to carrying same. This greatly decreases the space of a keyboard to be used, increases convenience and increases applications.

With the provisions of guide projections, protuberances, and protrusions, the fastening of the typewriter keys section to the function keys section, the keyboard shortcuts section, or the hand rest board is more secure, and their connections are more precise and quick. With the provisions of the internal motor driven moving devices, each pivotal glide can be driven by the motor driven moving device to adjust its inclined angle, thereby greatly increasing applications.

Other objects, features and advantages of the invention will become apparent from the following detailed description taken with the accompanying drawings

DETAILED DESCRIPTION OF THE INVENTION

Figure 1:
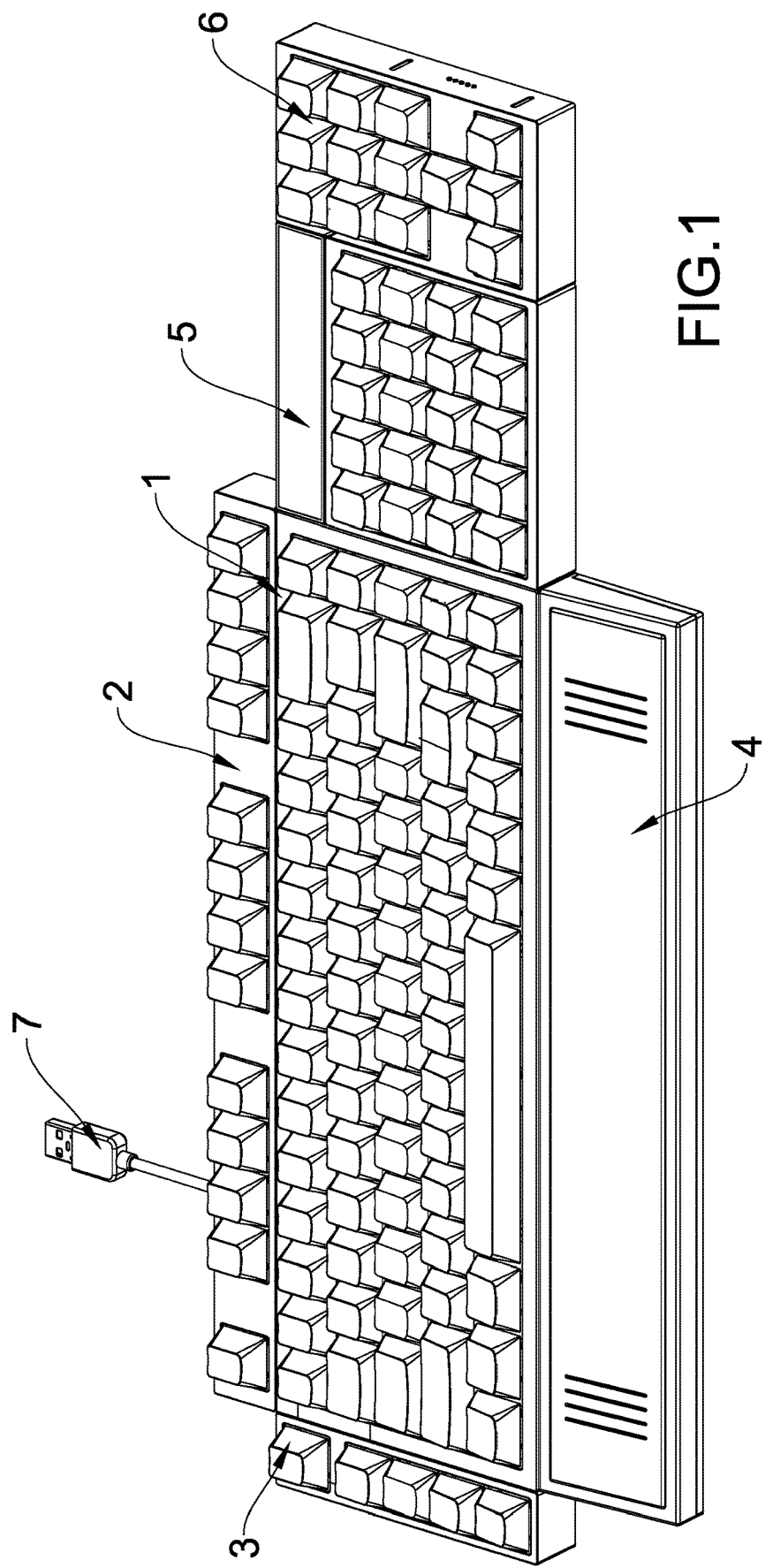
FIG. 1 is a perspective view of a modular keyboard of the invention.
Figure 2:
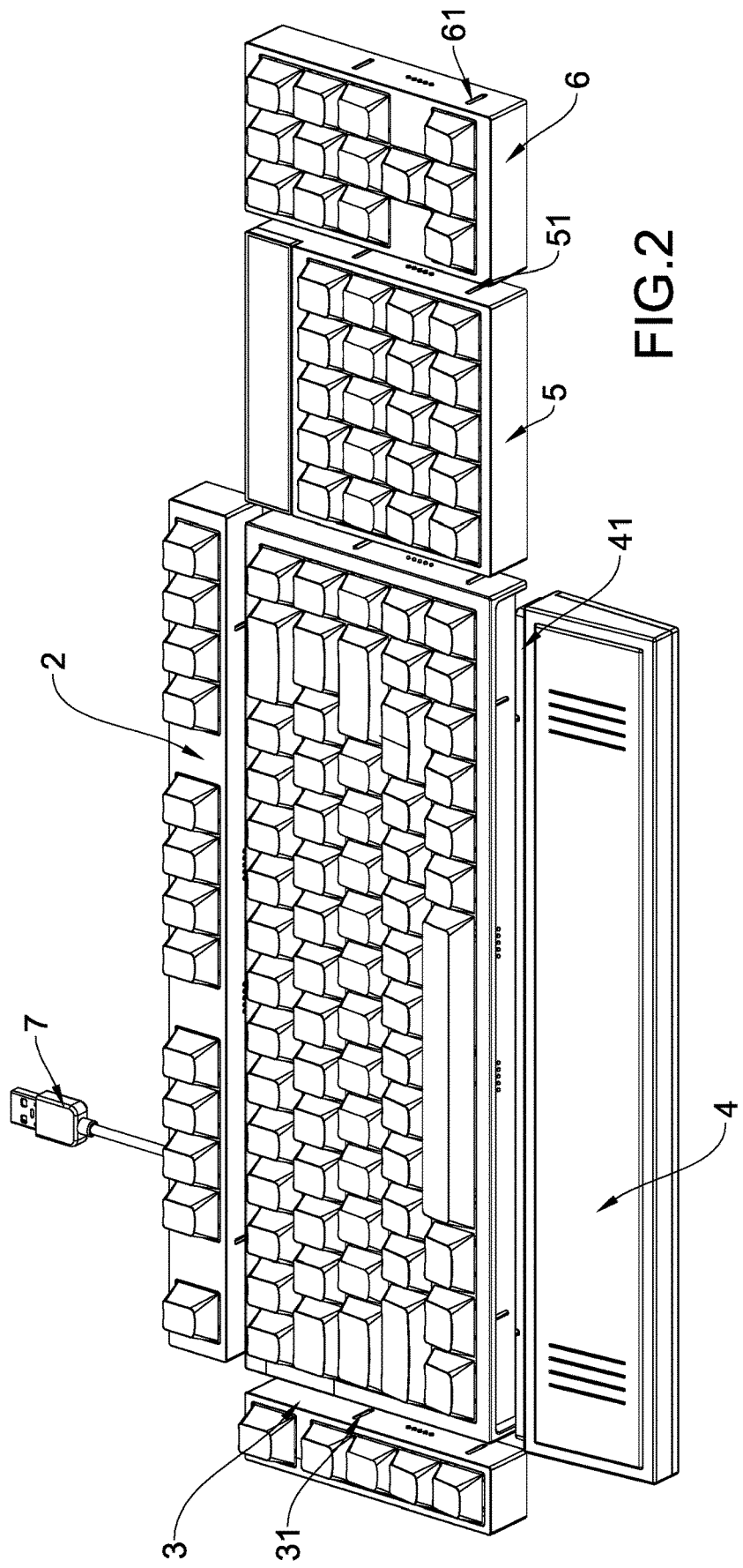
FIG. 2 is an exploded view of the modular keyboard.
Figure 3:
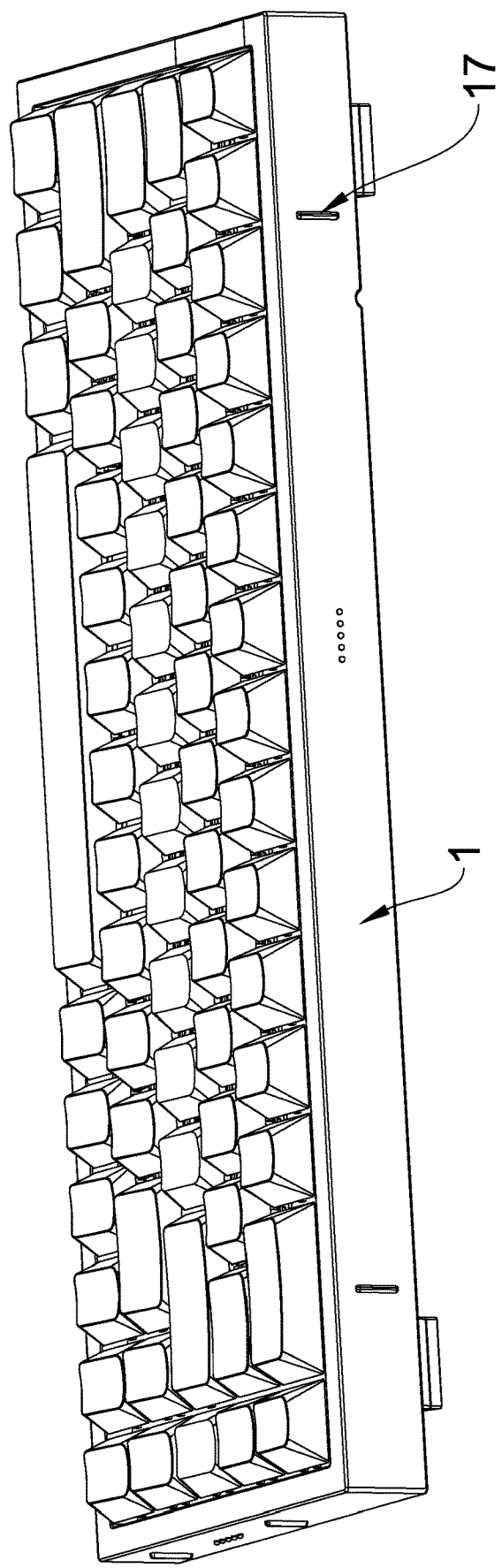
FIG. 3 is perspective view of the typewriter keys section viewed from the rear.
Figure 4:
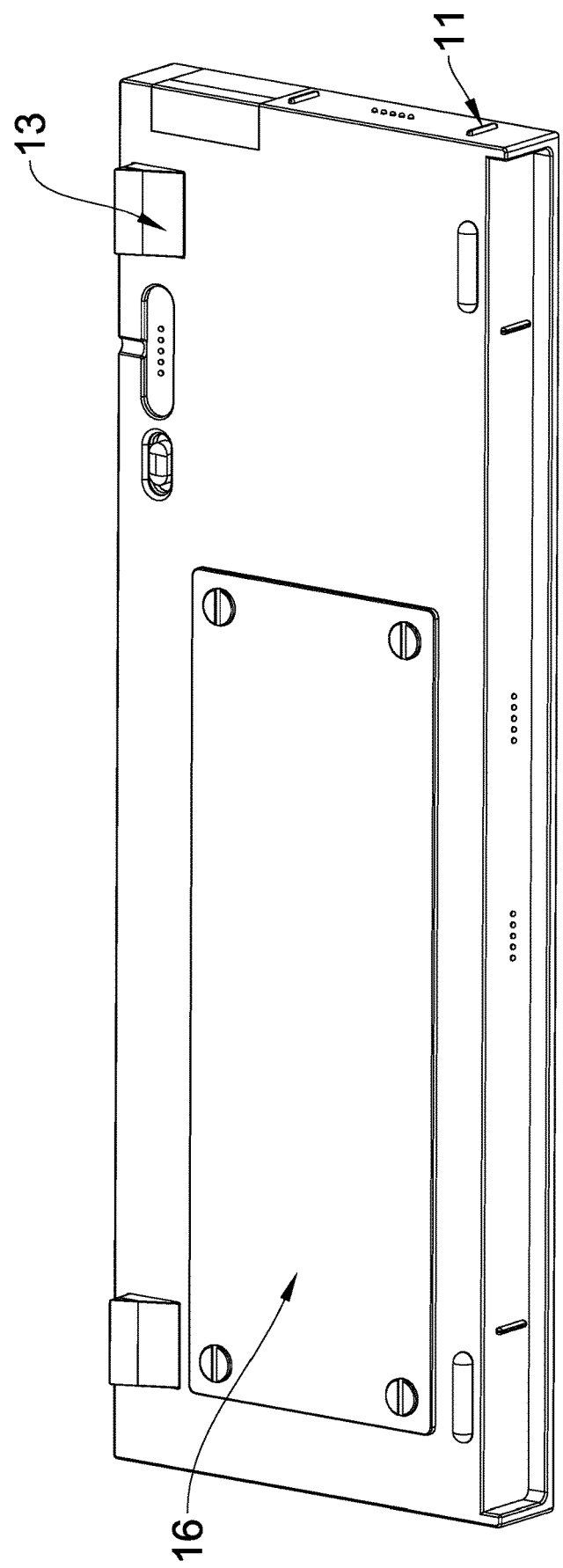
FIG. 4 is a perspective view of the typewriter keys section viewed from the bottom.
Figure 5:
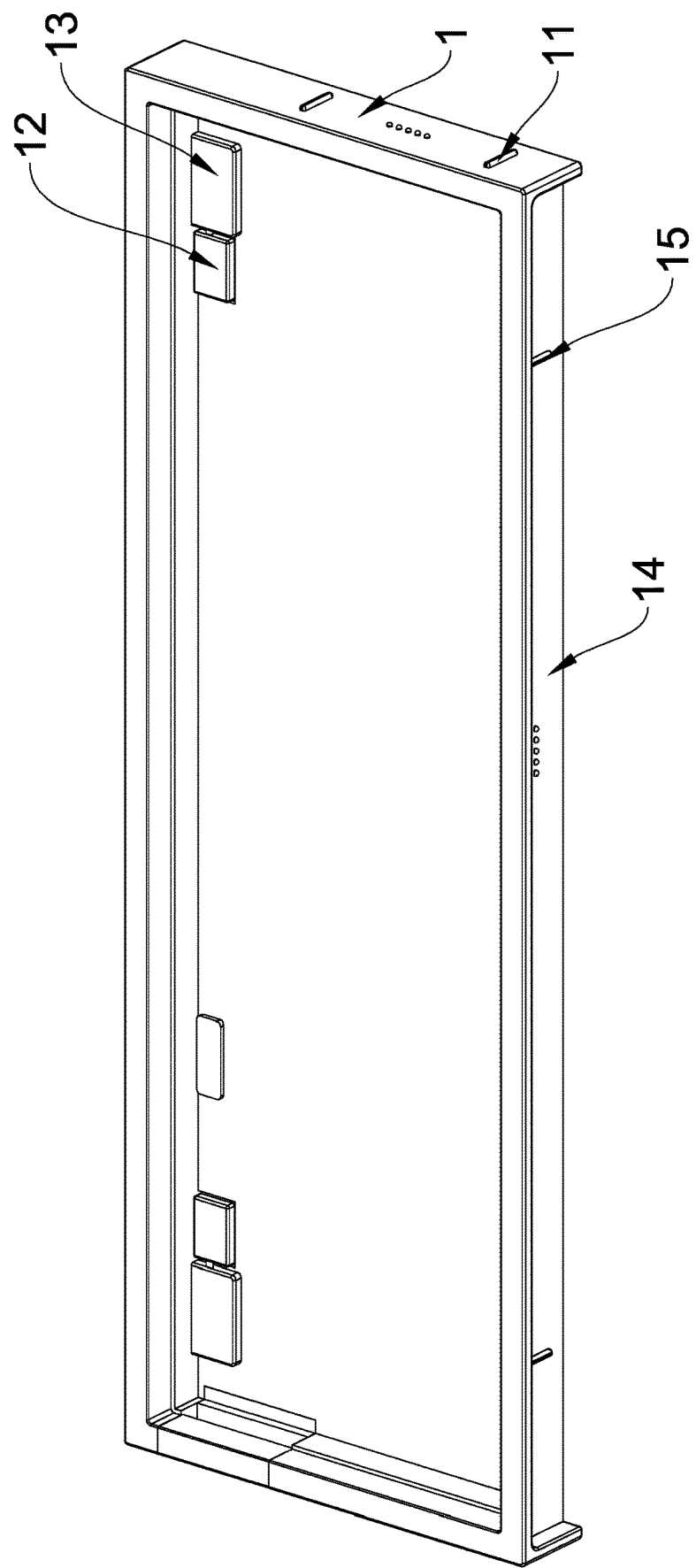
FIG. 5 is a perspective view of the typewriter keys section viewed from the front.
Figure 6:
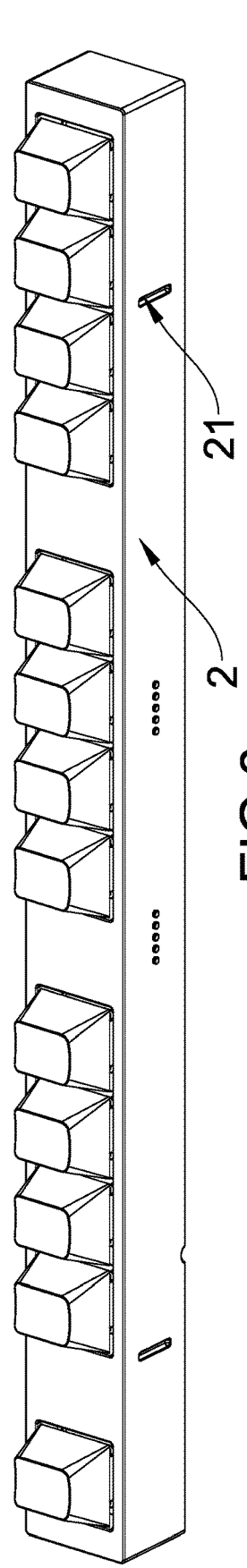
FIG. 6 is a perspective view of the function keys section view from the top.
Figure 7:
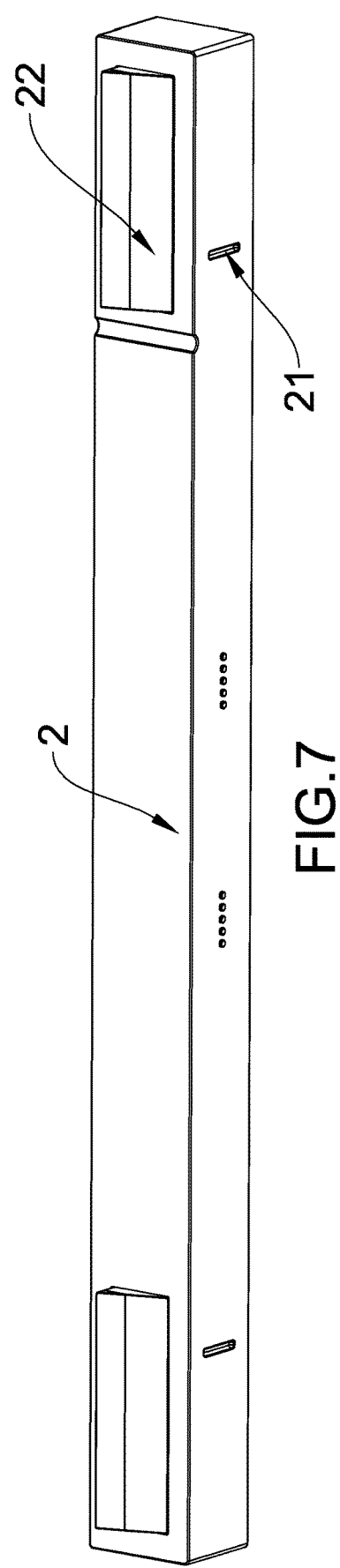
FIG. 7 is a perspective view of the function keys section view from the bottom.
Figure 9:
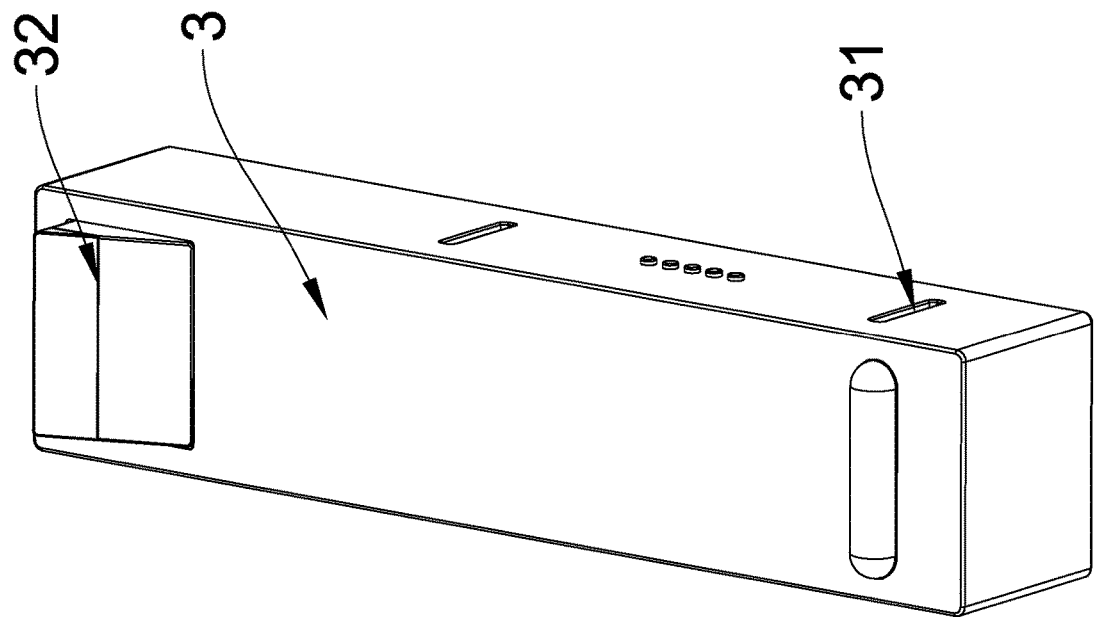
FIG. 9 is a perspective view of the keyboard shortcuts section viewed from the bottom.
Figure 8:
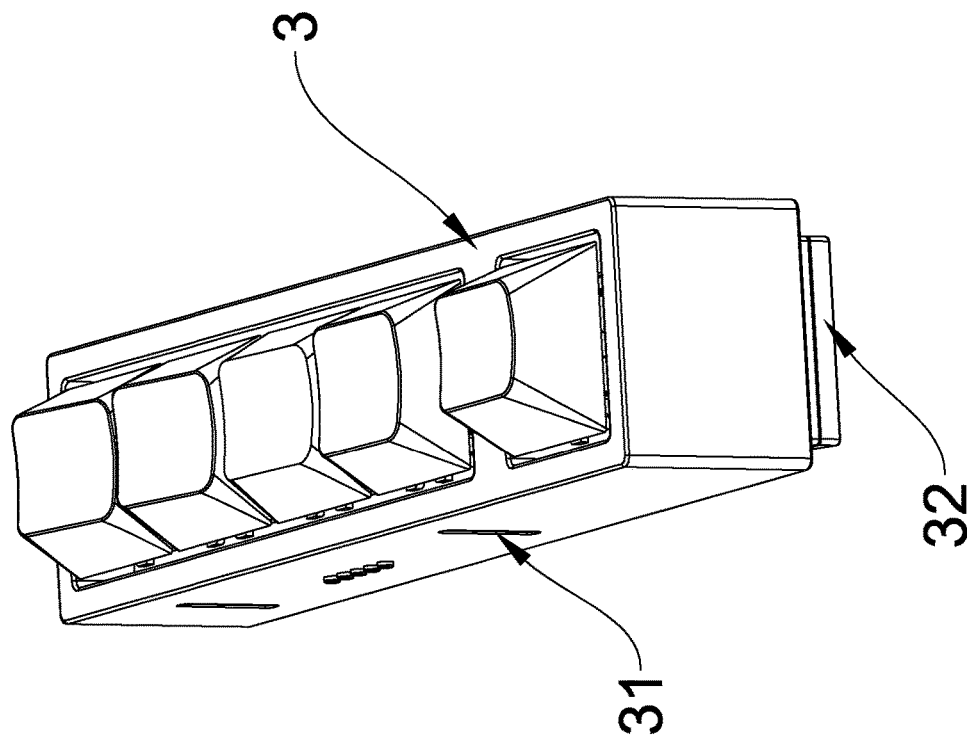
FIG. 8 is a perspective view of the keyboard shortcuts section viewed from the top.
Figure 10:
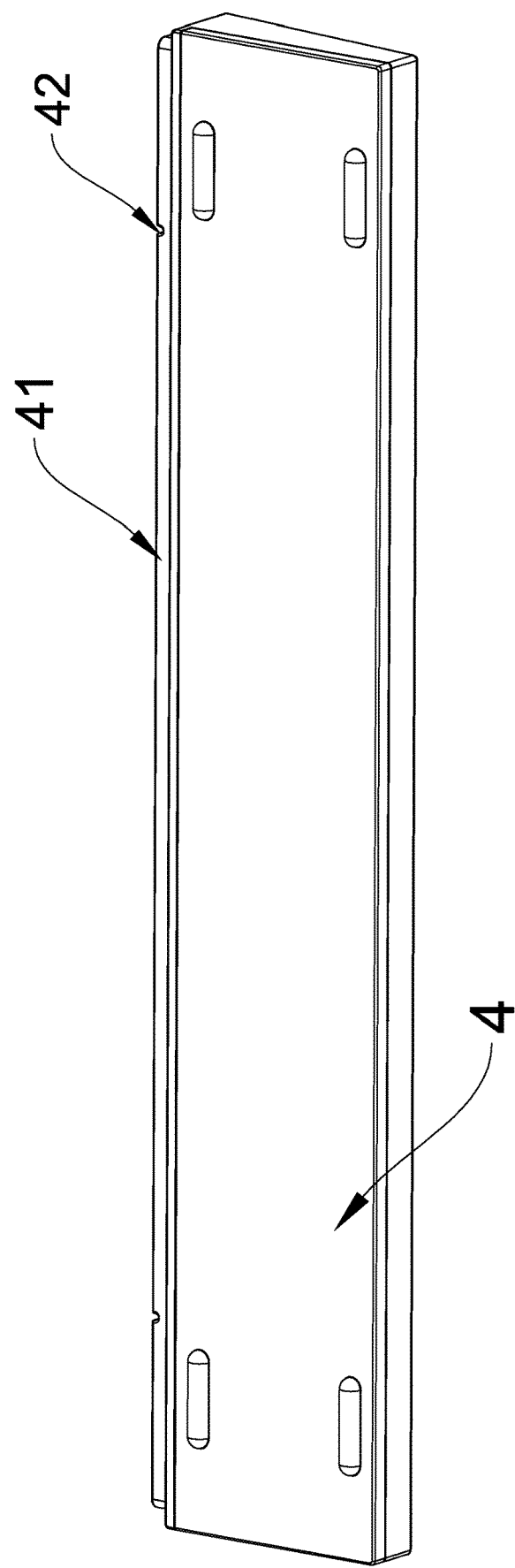
FIG. 10 is a perspective view of the hand rest board viewed from the bottom.
Figure 12:
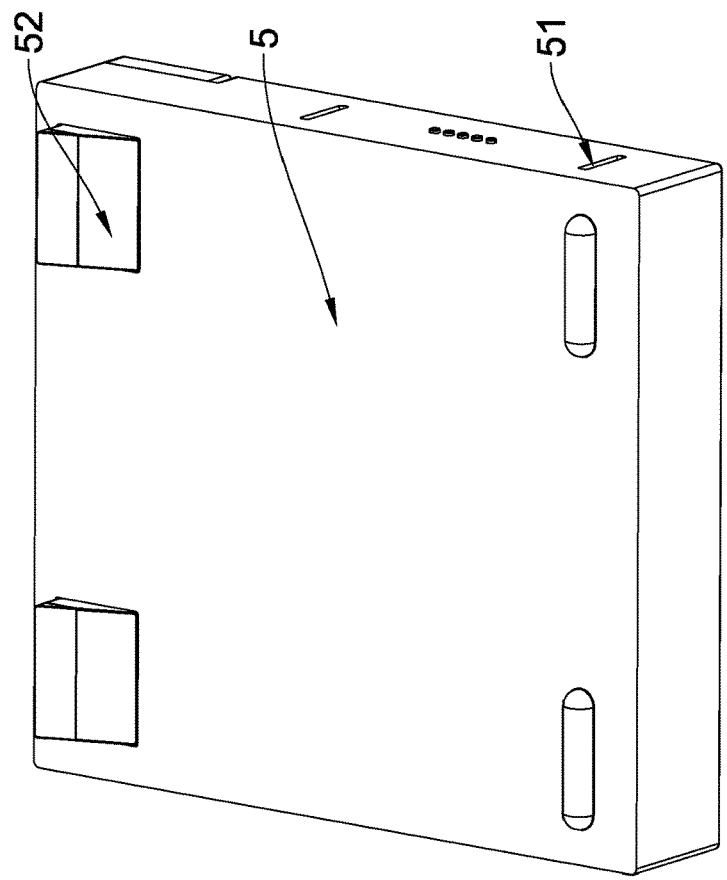
FIG. 12 is a perspective view of the numeric keypad from the bottom.
Figure 11:
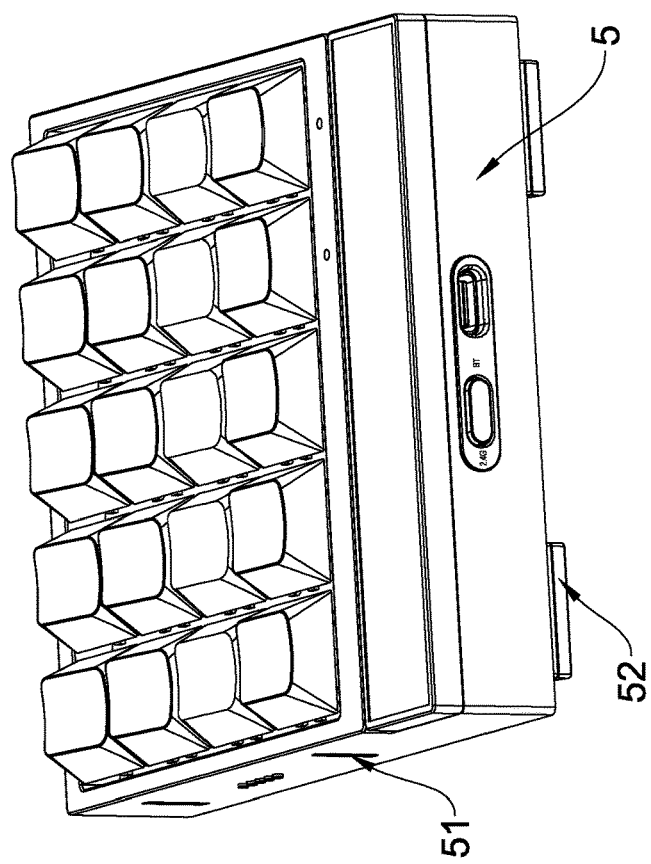
FIG. 11 is a perspective view of the numeric keypad from the top.
Figure 15:
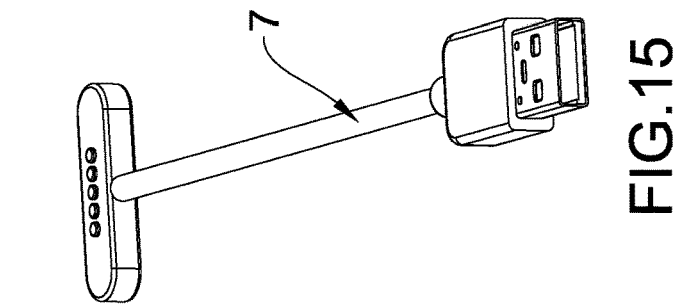
FIG. 15 is a perspective view of the keyboard cable.
Figure 14:
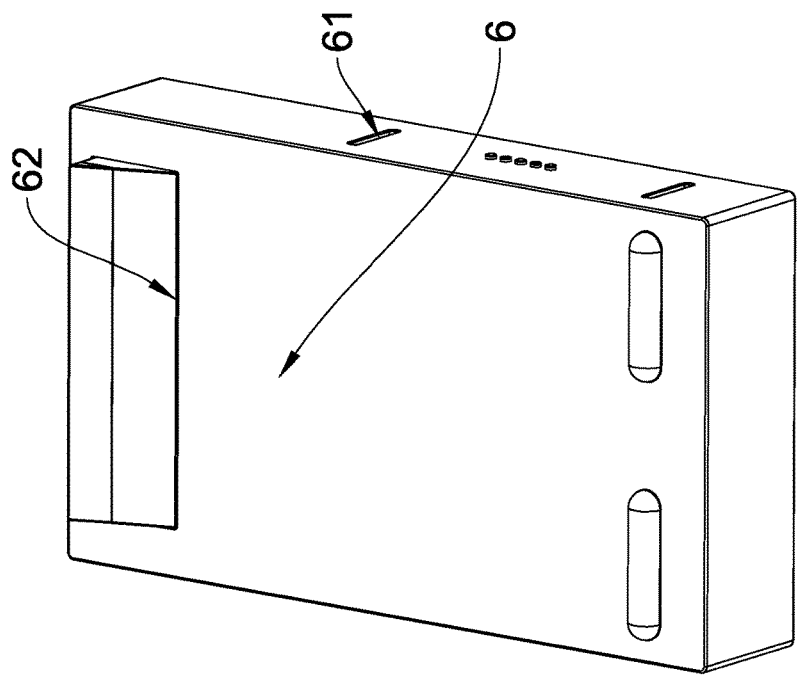
FIG. 14 is a perspective view of the cursor control and system command keys section viewed from the bottom.
Figure 13:
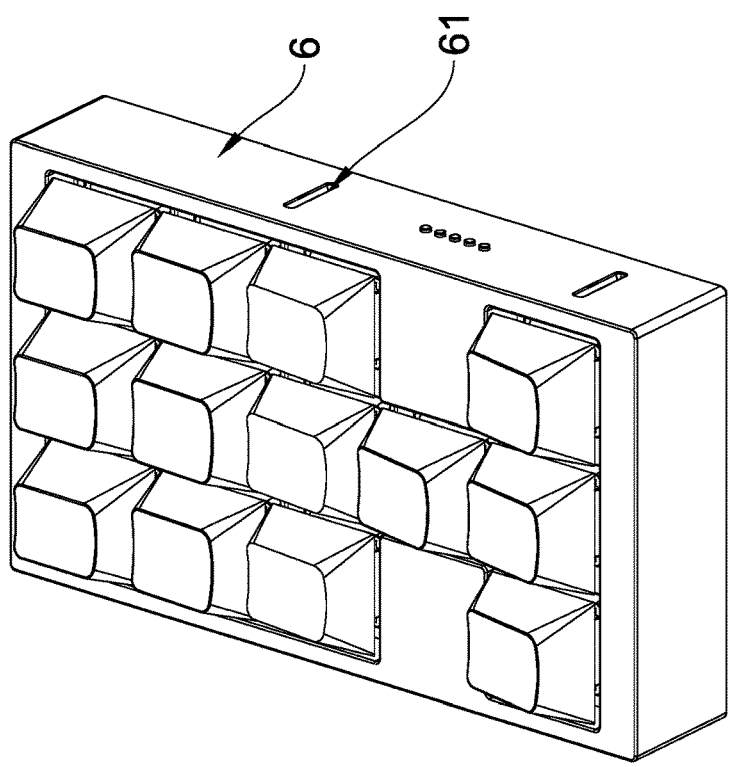
FIG. 13 is a perspective view of the cursor control and system command keys section viewed from the top.

Referring to FIGS. 1 to 15, a modular keyboard in accordance with the invention comprises a typewriter keys section 1, a function keys section 2, a keyboard shortcuts section 3, a numeric keypad 5, a cursor control and system command keys section 6 and a keyboard cable 7 as discussed in detail below.

The typewriter keys section 1 has a plurality of contacts on the back electrically connected to the function keys section 2. The typewriter keys section 1 further has a plurality of contacts on the left side electrically connected to the keyboard shortcuts section 3. The typewriter keys section 1 has a plurality of contacts on the front end electrically connected to a hand rest board 4. The typewriter keys section 1 further has a plurality of contacts on the right side electrically connected to the numeric keypad 5. The numeric keypad 5 has a plurality of contacts on the right side electrically connected to the cursor control and system command keys section 6. The typewriter keys section 1 further has a plurality of contacts on the rear end electrically connected to the keyboard cable 7. All of above contacts are implemented as magnetic contacts.

A plurality of guide projections 11 are provided on either side of the typewriter keys section 1. A 2.4G wireless transmission module and a Bluetooth transmission module are provided in each of the typewriter keys section 1, the function keys section 2, the keyboard shortcuts section 3, the hand rest board 4, the numeric keypad 5, the cursor control and system command keys section 6 and the keyboard cable 7. The 2.4G wireless transmission module and the Bluetooth transmission module are in data communication with the keyboard cable 7 for providing a plurality of different data transfer models for user selection.

The keyboard shortcuts section 3 includes a plurality of guide grooves 31 at either side. The guide projections 11 on the left side of the typewriter keys section 1 are inserted into the guide grooves 31 on the right side of the keyboard shortcuts section 3 respectively. This arrangement further enhances the magnetic engagement of the typewriter keys section 1 and the keyboard shortcuts section 3, thereby securing the keyboard shortcuts section 3 to the typewriter keys section 1. The typewriter keys section 1 are provided with two internal motor driven moving devices 12 and two pivotal glides 13 on the bottom, each pivotal glide 13 driven by the motor driven moving device 12 to adjust its inclined angle. There are further provided a lengthwise trough 14 on the front end of the typewriter keys section 1, and two guide protuberances 15 on the trough 14. The hand rest board 4 includes a lengthwise protrusion 41 on the rear end configured to complimentarily dispose in the trough 14, and two guide troughs 42 in the protrusion 41 configured to complimentarily receive the guide protuberances 15 respectively. The rear end of the typewriter keys section 1 is provided with two guide protrusions 17 configured to complimentarily dispose in two guide wells 21 which are provided in the front end of the function keys section 2. This arrangement further enhances the magnetic engagement of the typewriter keys section 1 and the function keys section 2, thereby securing the function keys section 2 to the typewriter keys section 1.

A weight plate 16 is detachably, threadedly secured to the bottom of the typewriter keys section 1 to increase stability of the typewriter keys section 1. Two glides 22 are provided on the bottom of the function keys section 2, and two glides 32 are provided on the bottom of the keyboard shortcuts section 3. Two guide grooves 51 are provided on either side of the numeric keypad 5. The guide grooves 51 on the left side of the numeric keypad 5 are configured to complimentarily receive the guide projections 11 of the right side of the typewriter keys section 1. This arrangement further enhances the magnetic engagement of the typewriter keys section 1 and the numeric keypad 5, thereby securing the numeric keypad 5 to the typewriter keys section 1. Two glides 52 are provided on the bottom of the numeric keypad 5, the cursor control and system command keys section 6 includes two guide grooves 61 on either side, and glides 62 on the bottom. Bottom of each of the typewriter keys section 1 and the function keys section 2 is provided with a socket (not shown) for attaching to an end of the keyboard cable 7.

As discussed above, the typewriter keys section 1, the function keys section 2, the keyboard shortcuts section 3, the numeric keypad 5, the cursor control and system command keys section 6 and the keyboard cable 7 of the modular keyboard of the invention are detachably connected together. The invention has the following advantages and benefits in comparison with the conventional art: a user may attach the typewriter keys section 1 to at least one of the function keys section 2, the keyboard shortcuts section 3, the numeric keypad 5, the cursor control and system command keys section 6 and the keyboard cable 7 as desired. Further, each of the typewriter keys section 1, the function keys section 2, the keyboard shortcuts section 3, the numeric keypad 5, the cursor control and system command keys section 6 and the keyboard cable 7 can be used independently. The user may detach at least one of the typewriter keys section 1, the function keys section 2, the keyboard shortcuts section 3, the numeric keypad 5, the cursor control and system command keys section 6 and the keyboard cable 7 prior to carrying same. This can greatly decrease the space of a keyboard to be used, increase convenience and increase applications.

While the invention has been described in terms of preferred embodiments, those skilled in the art will recognize that the invention can be practiced with modifications within the spirit and scope of the appended claims.

What is claimed is:

1. A modular keyboard, comprising:
a typewriter keys section;
a function keys section;
a keyboard shortcuts section;

a numeric keypad;
a cursor control and system command keys section; and
a keyboard cable;
wherein the typewriter keys section includes a plurality of first contacts on the back electrically connected to the function keys section, a plurality of second contacts on the left side electrically connected to the keyboard shortcuts section, a plurality of third contacts on the front end electrically connected to a hand rest board, a plurality of fourth contacts on the right side electrically connected to the numeric keypad, a plurality of fifth contacts on the rear end electrically connected to the keyboard cable, two internal motor driven moving devices, and two pivotal glides on the bottom, each pivotal glide driven by the motor driven moving device; and
wherein the numeric keypad includes a plurality of contacts on the right side electrically connected to the cursor control and system command keys section.

2. The modular keyboard of claim 1, wherein the typewriter keys section further comprises a lengthwise trough on the front end; and further comprising a hand rest board including a lengthwise protrusion on the rear end configured to complimentarily dispose in the lengthwise trough, and two guide troughs in the lengthwise protrusion.

3. The modular keyboard of claim 1, wherein the typewriter keys section further comprises two guide protuberances on the lengthwise trough, the guide protuberances configured to complimentarily dispose in the guide troughs respectively.

4. The modular keyboard of claim 1, wherein the typewriter keys section further comprises two guide protrusions on the rear end; and the function keys section includes two guide wells on the front end, the guide wells configured to complimentarily receive the guide protrusions.

5. The modular keyboard of claim 1, wherein the typewriter keys section further comprises a weight plate detachably, threadedly secured to the bottom; the function keys section includes two glides on the bottom; and the keyboard shortcuts section includes two glides on the bottom.

6. The modular keyboard of claim 1, wherein the numeric keypad further comprises two guide grooves on either side of the numeric keypad, the guide grooves on the left side of the numeric keypad configured to complimentarily receive the guide projections of the right side of the typewriter keys section, and two glides on the bottom.

7. The modular keyboard of claim 1, wherein the cursor control and system command keys section includes two guide grooves on either side and a plurality of glides on the bottom.

* * * * *